United States Patent
Opel et al.

(10) Patent No.: US 8,714,949 B2
(45) Date of Patent: May 6, 2014

(54) WASHER FLUID PUMP

(75) Inventors: Patrick Opel, Rotenburg (DE); Dirk Ringler, Friedewald (DE)

(73) Assignee: Continental Automotive GmbH, Hannover (DE)

( * ) Notice: Subject to any disclaimer, the term of this patent is extended or adjusted under 35 U.S.C. 154(b) by 1185 days.

(21) Appl. No.: 12/102,183

(22) Filed: Apr. 14, 2008

(65) Prior Publication Data

US 2008/0260555 A1  Oct. 23, 2008

(30) Foreign Application Priority Data

Apr. 16, 2007  (DE) .......................... 10 2007 017 781

(51) Int. Cl.
*F04B 35/04* (2006.01)

(52) U.S. Cl.
USPC .......................................... 417/423.8; 417/53

(58) Field of Classification Search
USPC ......... 417/53, 423.9, 423.15, 423.11, 423.12, 417/423.13, 423.14, 424.1; 15/236.02, 321, 15/103, 220.1, 232
See application file for complete search history.

(56) References Cited

U.S. PATENT DOCUMENTS

| | | | | |
|---|---|---|---|---|
| 2,663,243 A | | 12/1953 | Wunderlich | ........................ 98/2 |
| 3,576,380 A | * | 4/1971 | Sargeant | .................. 417/423.11 |
| 3,871,796 A | * | 3/1975 | Mack | ....................... 417/423.11 |
| 3,909,872 A | * | 10/1975 | Molenaar | ................... 15/250.02 |
| 4,114,231 A | | 9/1978 | Nauta | .............................. 15/413 |
| 5,184,946 A | * | 2/1993 | Sato | .......................... 417/423.9 |
| 5,257,911 A | * | 11/1993 | Mota et al. | ....................... 417/63 |

(Continued)

FOREIGN PATENT DOCUMENTS

| DE | 19846755 B4 | 4/1999 | ................ B60S 1/48 |
|---|---|---|---|
| DE | 19907561 A1 | 12/1999 | ................ B60S 1/48 |

(Continued)

OTHER PUBLICATIONS

German Office Action, Germany Patent Application No. 102007017781.1, 4 pages, Jan. 12, 2012.

*Primary Examiner* — Charles Freay
*Assistant Examiner* — Amene Bayou
(74) *Attorney, Agent, or Firm* — King & Spalding L.L.P.

(57) ABSTRACT

In a washer fluid pump (2) for a window cleaning system (3) of a motor vehicle, a ventilation duct (21) of an electric motor (9) is guided in a labyrinth from a first plane (22) arranged in the electric motor (9) into the environment via a second plane (24) arranged in a collecting space (23). For this purpose, the ventilation duct (21) has two first sections (20) which lead vertically from the electric motor (9) into the collecting space (23), and two second sections (26) which open out vertically from the collecting space (23) into the environment. The first and the second sections (20, 26) are offset with respect to one another by 90°, so as to prevent an infiltration of spray water into the electric motor (9).

20 Claims, 3 Drawing Sheets

(56) References Cited

U.S. PATENT DOCUMENTS

| | | | |
|---|---|---|---|
| 5,480,289 A | 1/1996 | Lee | 417/360 |
| 6,053,708 A | 4/2000 | Nishikawa | 417/360 |
| 6,109,891 A * | 8/2000 | Sato | 417/423.14 |
| 6,339,272 B1 * | 1/2002 | Sato | 310/87 |
| 6,524,085 B2 | 2/2003 | Shoda et al. | 417/423.14 |
| 6,530,758 B1 | 3/2003 | Ritter et al. | 417/423.14 |
| 6,554,565 B2 | 4/2003 | Suzuki et al. | 415/121.2 |
| 6,616,425 B2 | 9/2003 | Kober | 417/423.14 |
| 7,284,969 B2 * | 10/2007 | Akimoto et al. | 417/423.9 |
| 2002/0001528 A1 | 1/2002 | Shoda et al. | 417/360 |
| 2002/0085934 A1 * | 7/2002 | Kober | 417/421 |
| 2004/0170514 A1 | 9/2004 | Mota Lopez et al. | 417/423.14 |
| 2005/0063845 A1 * | 3/2005 | Akimoto et al. | 417/423.9 |

FOREIGN PATENT DOCUMENTS

| | | | |
|---|---|---|---|
| DE | 10061013 | 12/2000 | B60S 1/48 |
| EP | 0466888 A1 | 1/1992 | B60S 1/48 |
| EP | 1167774 A2 | 1/2002 | F04D 25/06 |
| WO | 2007/031404 A1 | 3/2007 | B60S 1/48 |

* cited by examiner

WASHER FLUID PUMP

CROSS-REFERENCE TO RELATED APPLICATIONS

This application claims priority to German Patent Application Number 10 2007 017 781.1 filed on Apr. 16, 2007, and which is incorporated herein by reference in its entirety.

TECHNICAL FIELD

The invention relates to a washer fluid pump for a window cleaning system of a motor vehicle having a housing and having an electric motor which is arranged in the housing, having a pump unit which can be driven by the electric motor, and having a ventilation opening which is guided from the inside of the electric motor into the environment.

BACKGROUND

In modern window cleaning systems, washer fluid pumps of said type are often mounted on a washer fluid container and are known from practice. The ventilation duct which leads to a ventilation opening serves for acclimatization and pressure equalization of the housing which at least partially holds the electric motor, and is for example guided straight through the housing. Here, the ventilation opening must be large enough to permit an infiltration of air into the housing and an outflow of air out of the housing. An excessively small ventilation opening tends to become blocked, which often leads to a pressure build-up and to damage of sealing elements between the electric motor and the pump stage or to foreign objects being sucked into the interior of the electric motor. An excessively large ventilation opening, in contrast, leads to an infiltration of spray water into the electric motor. In both cases, the washer fluid pump can be destroyed and spontaneously fail.

It has already been considered to guide the ventilation duct radially out of the housing and to arrange a bulkhead in front of the ventilation opening. This however leads to very complex production of the washer fluid pump. Furthermore, it is for example possible for spray water to pass behind the bulkhead and infiltrate into the ventilation duct. Here, the fluid passes directly into the electric motor.

SUMMARY

A washer fluid pump of the type specified in the introduction can be refined in such a way that the washer fluid pump offers reliable protection of the electric motor from spray water and can be produced in a particularly cost-effective manner. According to an embodiment, a washer fluid pump for a window cleaning system of a motor vehicle may comprise a housing and an electric motor arranged in the housing, a pump unit which can be driven by the electric motor, and a ventilation duct which is guided from the inside of the electric motor into the environment, wherein in the intended installation position of the washer fluid pump, in which the electric motor is situated above the pump stage, the ventilation duct leads from a first plane arranged within the electric motor into a second plane situated below the first plane, and from the second plane downward into the environment.

According to a further embodiment, a first section of the ventilation duct, which leads away from the inside of the electric motor, may open out in a collecting space and a second section of the ventilation duct, which leads into the environment, may lead away from the collecting space, and the collecting space can be arranged below the delimitation of the inside of the electric motor. According to a further embodiment, the first section of the ventilation duct may extend vertically through a wall which forms the lower delimitation of the electric motor. According to a further embodiment, the first section of the ventilation duct may have a pocket which is guided radially to a bearing arrangement of the electric motor. According to a further embodiment, the second section of the ventilation duct may be arranged vertically. According to a further embodiment, two first sections of the ventilation duct may be arranged at diametrically opposite sides of the electric motor and two second sections of the ventilation duct may be connected to diametrically opposite sides of the collecting space, and the first sections may be offset with respect to the second sections of the ventilation duct by 90°. According to a further embodiment, the first plane can be arranged so as to be slightly inclined with respect to the first section of the ventilation duct. According to a further embodiment, the second plane may be arranged so as to be slightly inclined with respect to the second section of the ventilation duct. According to a further embodiment, the electric motor and the pump stage may have, in their sides which face towards one another, a common housing part which is produced in one piece, the housing part has a constriction between the electric motor and the pump stage, and a casing which engages in the manner of a tube over the housing and the constriction may delimit the collecting space. According to a further embodiment, the tubular casing may have a vertical depression, which is guided from the collecting space to the pump stage, for forming the second section of the ventilation duct. According to a further embodiment, the tubular casing may be produced in one piece with a second housing part which has a suction pipe of the pump stage.

BRIEF DESCRIPTION OF THE DRAWINGS

The invention permits numerous embodiments. In order to further clarify its basic principle, one of said embodiments is illustrated in the drawing and described below. In the drawing.

DETAILED DESCRIPTION

Figure 1:
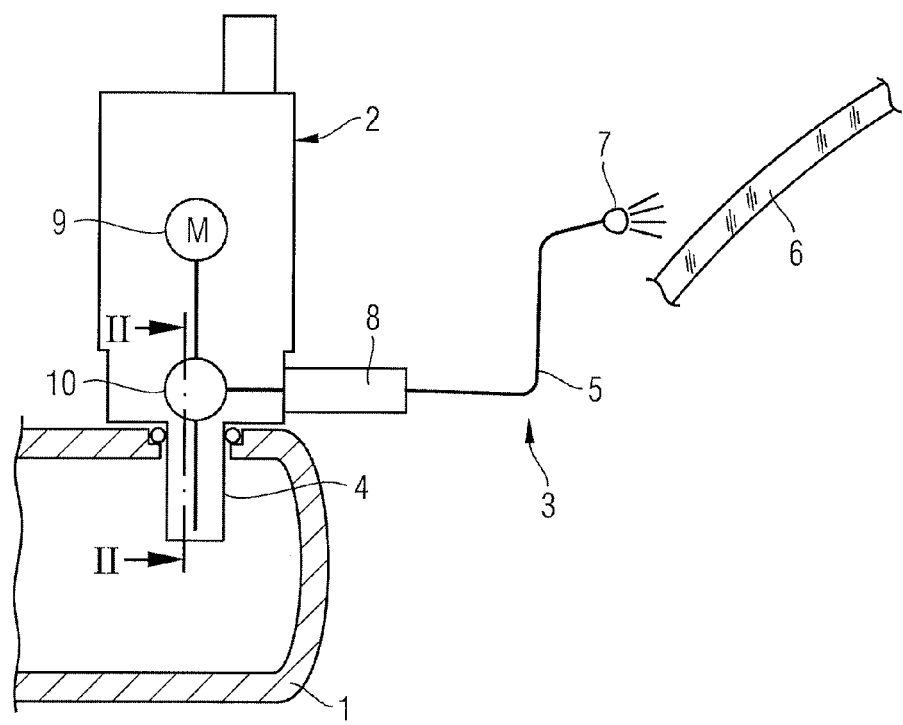
FIG. 1 schematically shows a washer fluid pump according to an embodiment mounted on a washer fluid container.

According to various embodiments, in the intended installation position of the washer fluid pump, in which the electric motor is situated above the pump stage, the ventilation duct may lead from a first plane arranged within the electric motor into a second plane situated below the first plane, and from the second plane downward into the environment.

By means of such a design, a labyrinth is formed by the different planes, which labyrinth prevents a direct passage of fluid into the electric motor. Spray water which passes to the washer fluid pump according to various embodiments can initially pass only to the second and therefore the lower plane. Since the plane of the electric motor is arranged above the second plane, a passage of fluid directly into the electric motor is prevented. The fluid can pass into the electric motor only if its filling level on the second plane reaches up to the first plane. The electric motor of the washer fluid pump according to various embodiments is therefore reliably protected from spray water. In frequently-used pump stages which suck up fluid vertically from below, the second plane is therefore arranged closer to a suction pipe of the pump stage than the first plane.

The structural expenditure for arranging the planes in the washer fluid pump according to various embodiments can be kept particularly low if a first section of the ventilation duct, which leads away from the inside of the electric motor, opens out in a collecting space and a second section of the ventilation duct, which leads into the environment, leads away from the collecting space, and if the collecting space is arranged below the delimitation of the inside of the electric motor. By means of said design, the first plane is arranged at the inside of the electric motor and the second plane is arranged in the collecting space which is arranged therebelow.

A simple outflow of fluid which has collected within the electric motor can be ensured in a simple manner according to an embodiment if the first section of the ventilation duct extends vertically through a wall which forms the lower delimitation of the electric motor. A further advantage of said design is that the first section of the ventilation duct can in this way be produced in a simple manner with side walls of the electric motor in an axially demoldable injection-molding die.

A bearing may be preferably arranged in walls which face toward the electric motor, which bearing serves to mount a shaft, which leads to the pump stage, of the electric motor. Fluid which infiltrates into the bearing can, according to another embodiment, be discharged in a simple manner if the first section of the ventilation duct has a pocket which is guided radially to a bearing arrangement of the electric motor.

The possibility of a passage of spray water into the collecting space can be largely prevented according to another embodiment if the second section of the ventilation duct is arranged vertically. In this way, it is also possible for spray water to flow out of the collecting space in a simple manner.

Washer fluid pumps arranged in motor vehicles are often slightly inclined depending on the inclination of the motor vehicle. In washer fluid pumps of said type, it is possible in a simple manner to ensure an outflow of fluid out of the electric motor if two first sections of the ventilation duct are arranged at diametrically opposite sides of the electric motor and two second sections of the ventilation duct are connected to diametrically opposite sides of the collecting space, and if the first sections are offset with respect to the second sections of the ventilation duct by 90°.

In order to further simplify the outflow of fluid out of the electric motor, it is expedient if the first plane is arranged so as to be slightly inclined with respect to the first section of the ventilation duct.

In order to further simplify the outflow of fluid out of the collecting space, it is expedient if the second plane is arranged so as to be slightly inclined with respect to the second section of the ventilation duct.

The washer fluid pump according to various embodiments is of particularly simple structural design if the electric motor and the pump stage have, in their sides which face towards one another, a common housing part which is produced in one piece, if the housing part has a constriction between the electric motor and the pump stage, and if a casing which engages in the manner of a tube over the housing and the constriction delimit the collecting space.

The components of the washer fluid pump according to various embodiments are of particularly simple construction and can be produced particularly cost-effectively from plastic in an injection-molding process if the tubular casing has a vertical depression, which is guided from the collecting space to the pump stage, for forming the second section of the ventilation duct.

In order to reduce the number of components to be assembled, according to another embodiment, it is expedient if the tubular casing is produced in one piece with a second housing part which has a suction pipe of the pump stage.

FIG. 1 shows a washer fluid pump 2 which is mounted on a washer fluid container 1, and schematically shows adjoining regions of a window cleaning system 3 of a motor vehicle. For simplicity, only a partial region of the washer fluid container 1 is illustrated. The washer fluid pump 2 extends with a suction pipe 4 into the washer fluid container 1 and feeds washer fluid via a washer fluid line 5 to a washer nozzle 7 which is arranged in front of a window 6. To connect the washer fluid line 5, the washer fluid pump 2 has a connecting pipe 8. The washer fluid pump 2 has a pump stage 10 which is driven by an electric motor 9.

Figure 2:
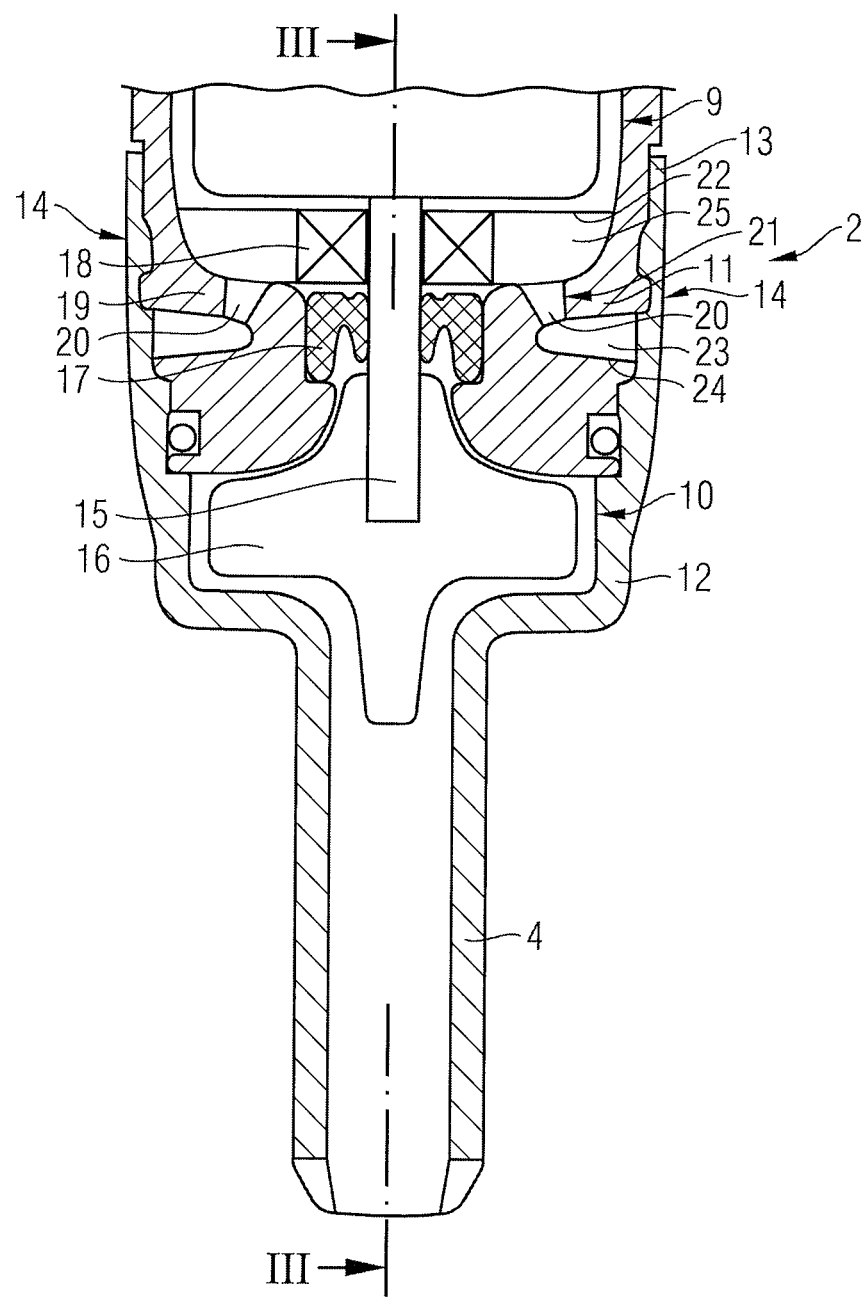
FIG. 2 shows a greatly enlarged partial section through the washer fluid pump from FIG. 1 along the line II-II.

FIG. 2 shows, in a greatly enlarged section illustration through a partial region of the washer fluid pump 2 from FIG. 1 along the line II-II, the pump stage 10 and a partial region, which adjoins the pump stage 10, of the electric motor 9. The pump stage 10 and the electric motor 9 have, in their regions which adjoin one another, a common first housing part 11. A second housing part 12 which has the suction pipe 4 is produced in one piece with a tubular casing 13 and engages over the lower end of the common first housing part 11. The housing parts 11, 12 are connected to one another by means of a latching connection 14. The pump stage 10 has a rotor 16 which is fastened to a shaft 15 of the electric motor 9. A seal 17 seals the shaft 15 between the pump stage 10 and the electric motor 9. The shaft 15 of the electric motor 9 has a bearing arrangement 18 in the first housing part 11. A lower wall 19 of the common housing part 11 has a first section 20 of a ventilation line 21. The first section 20 of the ventilation line 21 leads from a first plane 22 in the electric motor 9 into a collecting space 23. The base of the collecting space 23 forms a second plane 24. Furthermore, the common housing part 11 has a pocket 25 which points radially inward to the arrangement bearing 18 of the shaft 15. Said pocket 25 permits an outflow of fluid, for example condensation water from the bearing arrangement 18. The collecting space 23 is delimited radially at the outside by the tubular casing 13 of the second housing part 12 and is designed as an encircling constriction of the first housing part 11.

Figure 3:
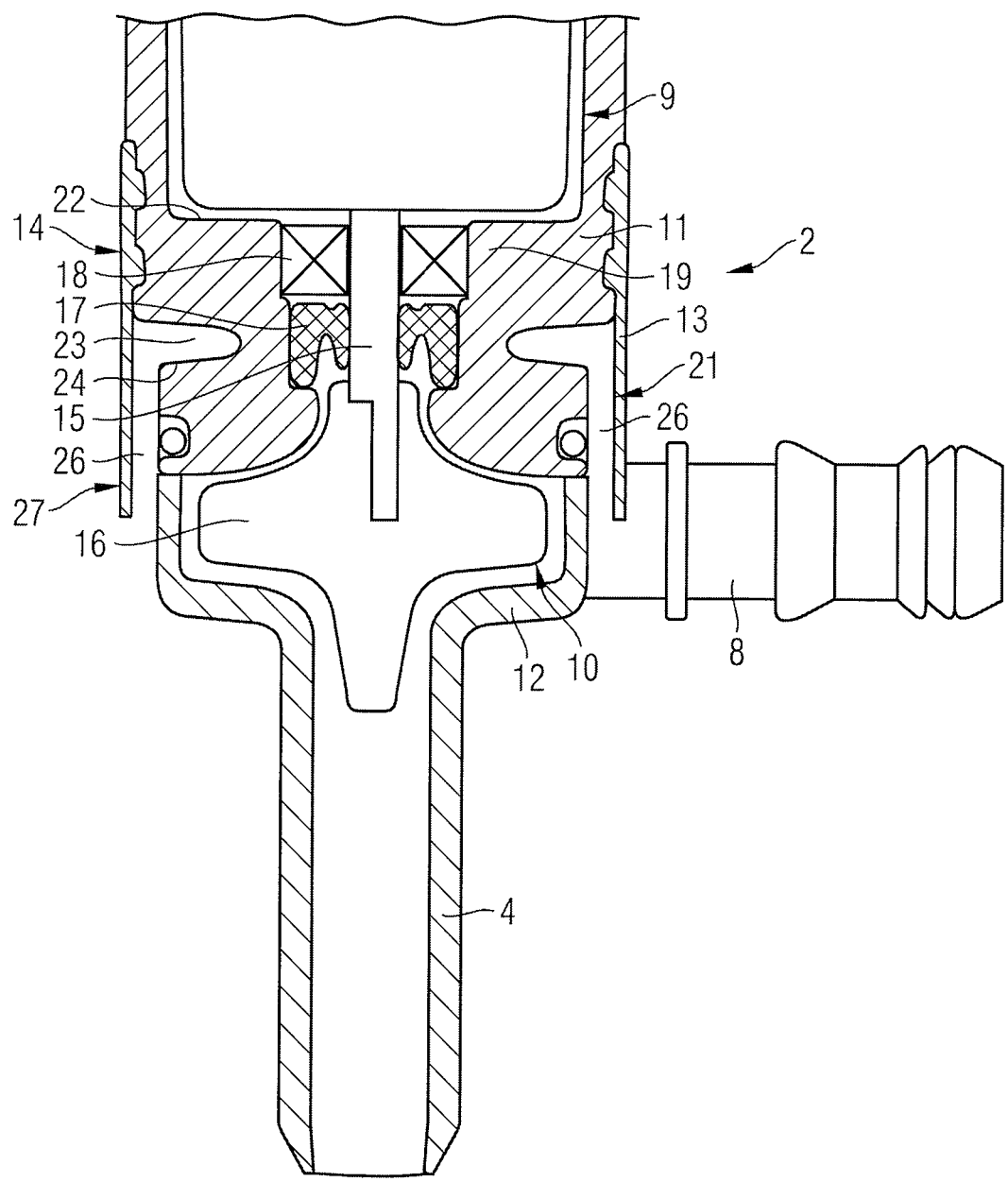
FIG. 3 shows a section illustration through the washer fluid pump from FIG. 2 along the line III-III.

FIG. 3 shows, in a section illustration through the partial region of the washer fluid pump 2 illustrated in FIG. 2 along the line III-III, that a second section 26 of the ventilation duct 21 from the collecting space 23 opens out into the environment. The second section 26 of the ventilation duct 21 is delimited radially at the inside by the first housing part 11 and radially at the outside by the second housing part 12. For this purpose, the tubular casing 13 of the second housing part 12 has a vertical depression 27. The vertical depression 27 is guided from the constriction, which delimits the radially inner contour of the collecting space 23, of the first housing part 11 to the pump stage 10. The first and the second sections 20, 26 of the ventilation duct 21 are in each case provided in pairs and arranged offset with respect to one another such that, when the housing parts 11, 12 are assembled, a labyrinth is generated which permits an outflow of fluid out of the electric motor 9 but prevents the infiltration of spray water via the ventilation duct 21 into the electric motor 9.

What is claimed is:
1. A washer fluid pump for a window cleaning system of a motor vehicle comprising:
   a housing defining a plurality of sections along its length;
   an electric motor arranged in a first section of the housing;
   a pump unit arranged in a second section of the housing and driven by the electric motor; and
   a ventilation duct providing fluid communication between an inside portion of the electric motor and an environment,
   wherein the ventilation duct leads along the length of the housing from a first plane perpendicular to the length of the housing and adjacent the electric motor to a second plane parallel to the first plane and disposed between the first plane and the pump unit, and along the length of the housing from the second plane into the environment, wherein the ventilation duct includes:

two first sections, each leading away from the inside of the electric motor, both first sections opening out into a single, shared collecting space disposed at the second plane, and two second sections, each leading away from the collecting space and into the environment, and wherein the two first sections of the ventilation duct are arranged at diametrically opposite sides of the electric motor and the two second sections of the ventilation duct are connected to diametrically opposite sides of the collecting space, and wherein the first sections are radially offset to the second sections of the ventilation duct by 90° in the second plane.

2. The washer fluid pump according to claim 1, wherein the first section of the ventilation duct extends vertically through a wall which forms the lower delimitation of the electric motor.

3. The washer fluid pump according to claim 1, wherein the first section of the ventilation duct has a pocket which is guided radially to a bearing arrangement of the electric motor.

4. The washer fluid pump according to claim 1, wherein the second section of the ventilation duct is arranged perpendicular to the first plane and the second plane.

5. The washer fluid pump according to claim 1, wherein the inside of the electric motor slightly inclined with respect to the first section of the ventilation duct.

6. The washer fluid pump according to claim 1, wherein an interior surface of the collecting space is slightly inclined with respect to the second section of the ventilation duct.

7. The washer fluid pump according to claim 1, wherein the electric motor and the pump unit have, in their sides which face towards one another, a common housing part which is produced in one piece, the housing part has a constriction between the electric motor and the pump unit, and wherein a casing which engages in the manner of a tube over the housing and the constriction delimit the collecting space.

8. The washer fluid pump according to claim 7, wherein the tubular casing has a vertical depression, which is guided from the collecting space to the pump unit, for forming the second section of the ventilation duct.

9. The washer fluid pump according to claim 7, wherein the tubular casing is produced in one piece with a second housing part which has a suction pipe of the pump unit.

10. A method of operating a washer fluid pump for a window cleaning system of a motor vehicle comprising a housing and an electric motor arranged in a first section along a length of the housing, the method comprising the steps of:

driving a pump unit arranged in a second section along the length of the housing by the electric motor, and venting the inside of the electric motor through a ventilation duct providing fluid communication between the inside of the electric motor and an environment, wherein the ventilation duct leads along the length of the housing from a first plane perpendicular to the length of the housing and the electric motor to a second plane parallel to the first plane and disposed between the first plane and the pump unit, and from the second plane along the length of the housing into the environment, wherein the ventilation duct includes:

two first sections, each leading away from the inside of the electric motor, both first sections opening out into a single, shared collecting space disposed at the second plane, and two second sections, each leading away from the collecting space and into the environment, and wherein the two first sections of the ventilation duct are arranged at diametrically opposite sides of the electric motor and the two second sections of the ventilation duct are connected to diametrically opposite sides of the collecting space, and wherein the first sections are radially offset to the second sections of the ventilation duct by 90° in the second plane.

11. The method according to claim 10, wherein the first section of the ventilation duct extends through a wall which forms a delimitation of the electric motor.

12. The method according to claim 10, wherein the first section of the ventilation duct includes a pocket disposed radially from a bearing arrangement of the electric motor.

13. The method according to claim 10, wherein the second section of the ventilation duct extends along the length of the housing.

14. The method according to claim 10, wherein an interior surface of the electric motor is slightly inclined with respect to the first section of the ventilation duct.

15. The method according to claim 10, wherein an interior surface of the collecting space is slightly inclined with respect to the second section of the ventilation duct.

16. The method according to claim 10, wherein the housing includes a common housing part in one piece, disposed around the sides of the electric motor and the pump unit which face towards one another, wherein the housing part defines constriction between the electric motor and the pump unit, and wherein a casing which engages in the manner of a tube over the housing and the constriction delimit the collecting space.

17. A washer fluid pump for a window cleaning system of a motor vehicle comprising:

a housing defining a plurality of sections along its length;

an electric motor arranged in a first section of the housing;

a pump unit arranged in a second section of the housing and driven by the electric motor; and a ventilation duct providing fluid communication between an inside portion of the electric motor and an environment, wherein the ventilation duct leads along the length of the housing from a first plane perpendicular to the length of the housing and adjacent the electric motor to a second plane parallel to the first plane and disposed between the first plane and the pump unit, and from the second plane along the length of the housing into the environment, wherein the ventilation duct comprises:

two first sections, each leading away from the inside of the electric motor, both first sections opening out into a single, shared collecting space, and two second sections, each leading away from the collecting space and into the environment, and wherein the first sections are radially offset to the second sections of the ventilation duct by 90° in the second plane.

18. The washer fluid pump according to claim 17, wherein the first section of the ventilation duct has a pocket which is guided radially to a bearing arrangement of the electric motor.

19. The washer fluid pump according to claim 17, wherein an interior surface of the electric motor is slightly inclined with respect to the first section of the ventilation duct and an interior surface of the collecting space is slightly inclined with respect to the second section of the ventilation duct.

20. The washer fluid pump according to claim 17, wherein the electric motor and the pump unit have, in their sides which face towards one another, a common housing part which is produced in one piece, the housing part has a constriction between the electric motor and the pump unit, and wherein a casing which engages in the manner of a tube over the housing and the constriction delimit the collecting space.

* * * * *